(12) United States Patent
Kimura

(10) Patent No.: US 6,469,774 B1
(45) Date of Patent: *Oct. 22, 2002

(54) IMAGE READING APPARATUS

(75) Inventor: Kazumi Kimura, Toda (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/383,623

(22) Filed: Aug. 26, 1999

(30) Foreign Application Priority Data

Aug. 27, 1998 (JP) .............................. 10-257537

(51) Int. Cl.$^7$ .......................... G03B 27/54; H04N 1/04; G02B 27/00
(52) U.S. Cl. .......................... 355/67; 358/475; 359/601; 359/613
(58) Field of Search .............................. 355/39, 55, 67, 355/68, 71; 358/474, 475; 359/601, 602, 613, 614; 399/118; 356/368

(56) References Cited

U.S. PATENT DOCUMENTS

| | | | | | |
|---|---|---|---|---|---|
| 4,421,400 A | * | 12/1983 | Dannatt | ........................ | 355/1 |
| 5,341,245 A | * | 8/1994 | Tamagawa et al. | ......... | 359/739 |
| 5,566,006 A | | 10/1996 | Yoshinaga et al. | .......... | 358/475 |
| 5,929,978 A | * | 7/1999 | Masaki | ........................ | 355/53 |
| 5,982,511 A | * | 11/1999 | Sato | ........................... | 358/475 |
| 6,028,671 A | * | 2/2000 | Svetkoff et al. | ............ | 356/368 |

* cited by examiner

*Primary Examiner*—Russell Adams
*Assistant Examiner*—Roy Fuller
(74) *Attorney, Agent, or Firm*—Fitzpatrick, Cella, Harper & Scinto (57) ABSTRACT

In an image reading apparatus, an original placed on an original glass table is illuminated by a light source, and a light beam corresponding to image information of an original surface illuminated with the light source is focused on a sensor by an imaging optical system. The sensor for reading image information is so disposed as not to be perpendicular to an optical axis of the imaging optical system. In an apparatus, $\theta_i \geq \sin^{-1}(NA_i)$ is satisfied, where $\theta_i$ is the tilt angle of the sensor with respect to the optical axis of the imaging optical system, and $NA_i$ is the numerical aperture of the imaging optical system on a sensor side.

22 Claims, 7 Drawing Sheets

IMAGE READING APPARATUS

BACKGROUND OF THE INVENTION

1. Field of the Invention

The present invention relates to an image reading apparatus and, more particularly, to removal of flare in an image reading apparatus using a slit exposure optical system.

2. Related Background Art

Figure 1:
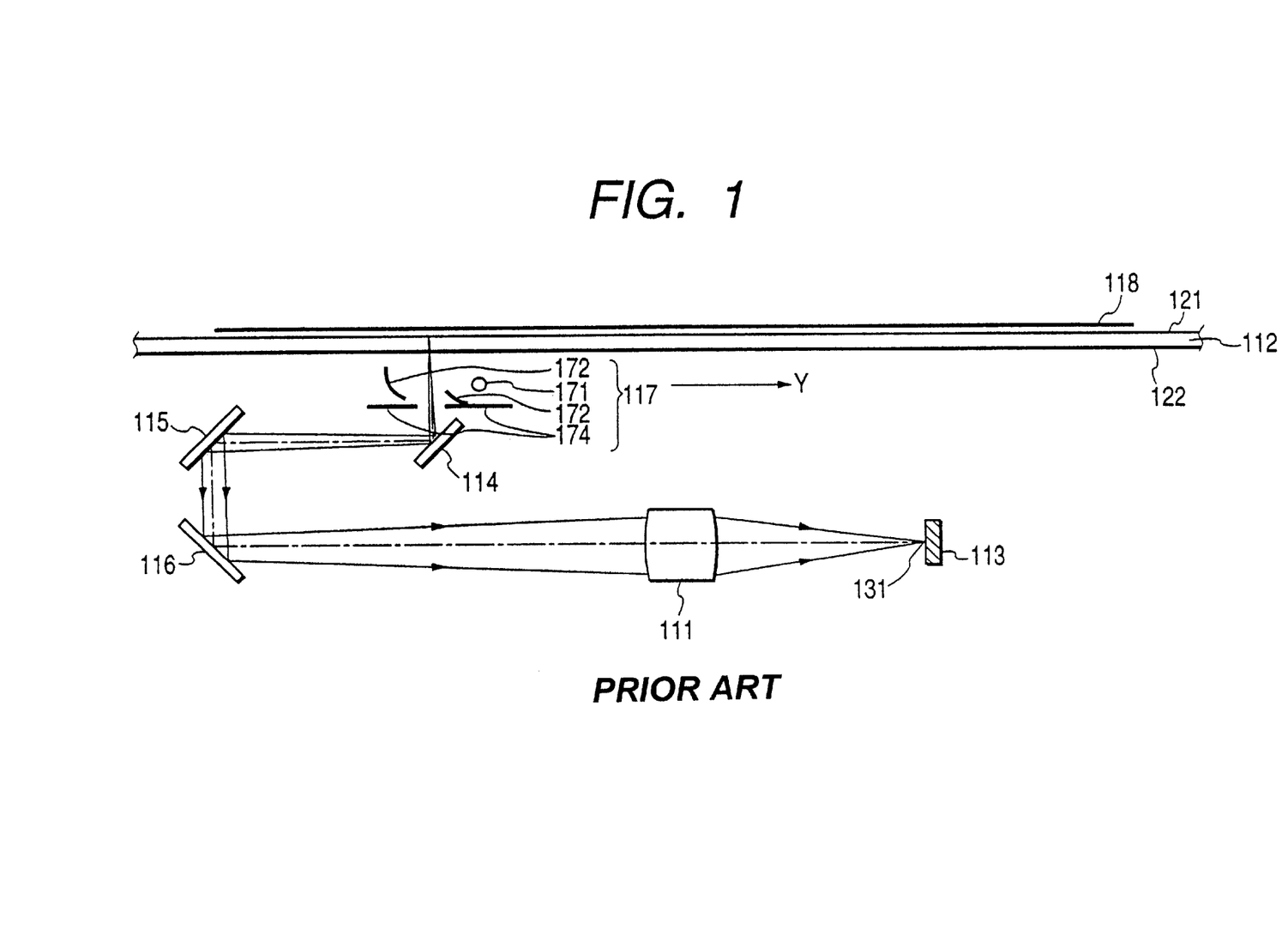
FIG. 1 is a schematic view showing the main part of a conventional image reading apparatus.

FIG. 1 is a schematic view showing the main part of a conventional image reading apparatus used in a digital copying machine, flat bed scanner, or the like.

Referring to FIG. 1, an original 118 placed on an original glass table 112 is illuminated from the two sides with a direct light beam from a light source 171 and a light beam incident through a reflector 172. The light beam reflected by the original 118 passes through a stop (slit) 174 and is focused on the surface of a CCD (line sensor) 113 by an imaging lens 111 through first, second, and third scanning mirrors 114, 115, and 116. The optical image formed on the surface of the CCD 113 is converted into an electrical signal in accordance with the density of the original 118, and one-line image information (in the main scanning direction (direction perpendicular to the drawing sheet of FIG. 1) is read. Image information in the sub-scanning direction (direction indicated by an arrow Y in FIG. 1) is read as follows. The first mirror table comprised of the light source 171, a reflector 172, the stop 174, and the first scanning mirror (full-speed scanning mirror) 114 is moved in the sub-scanning direction with respect to the original 118. The second mirror table comprised of the second and third scanning mirrors (half-speed mirrors) 115 and 116 is moved in the sub-scanning direction at a speed half (moving speed ratio of 2:1) that of the first mirror table. The image information of the original 118 is read while the optical path length from the original 118 to the CCD 113 is kept constant.

The light source, reflector, slit, first to third scanning mirrors, and CCD in the image reading apparatus of this type stretch in a direction (main scanning direction) perpendicular to the page of drawing to read the entire line of the original in the main scanning direction and the entire area of the original by scanning the first and second mirror tables. This optical system is a so-called slit exposure optical system.

The CCD pixel array is composed of one line for a monochrome image read and three adjacent lines (monolithic 3-line sensor) of R, G, and B for a color image read. The magnification of the imaging lens is determined by the original read pitch and CCD pixel pitch. For example, when the read pitch is 600 DPI and the CCD pixel pitch is 7 µm, the imaging magnification β is ×0.16535.

Figure 2:
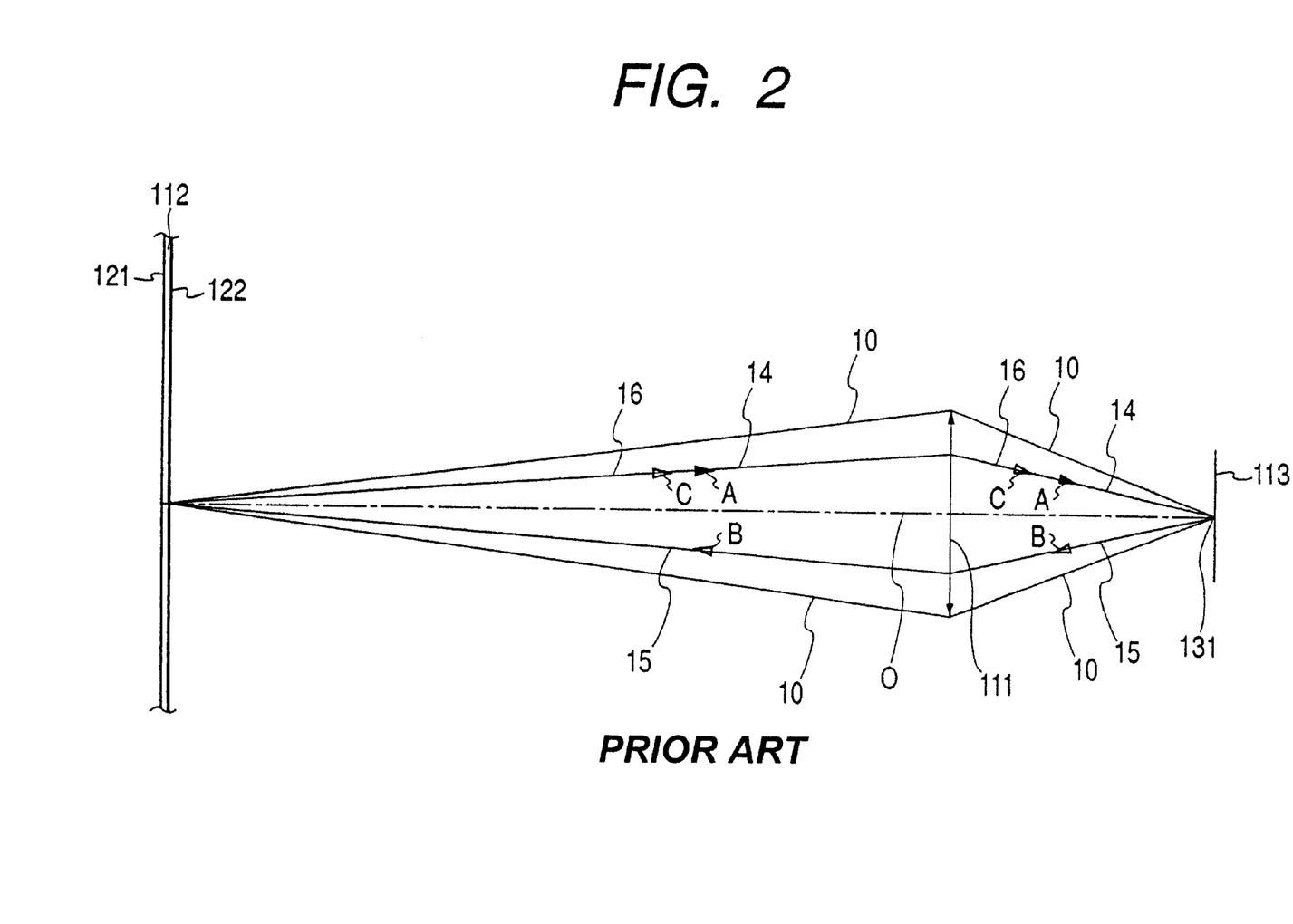
FIG. 2 is a schematic view showing the main part showing the paraxial layout of a lens in FIG. 1.

The above image reading apparatus suffers from the following various problems. Such a problem is described with reference to FIG. 2. FIG. 2 is a schematic view showing the main part of the optical system of the image reading apparatus in FIG. 1 from the viewpoint of paraxial optics. For the descriptive convenience, as the main constituent elements in FIG. 1, only the imaging lens 111, original glass table 112, and CCD 113 are extracted. At the same time, an optical axis O of the imaging lens 111, marginal light rays 10, and typical light rays 14, 15, and 16 are illustrated.

Along with the higher integration of recent CCD substrates, the semiconductor process techniques have been re-examined to increase the yield, and the surface precision of electrodes on the CCD substrate has improved. As the CCD surface has become an almost mirror surface, the imaging light beam incident on or near the CCD pixel array is partially reflected by the CCD surface. For example, the light ray 14 (travelling in the A direction) as part of the imaging light beam is partially reflected by a pixel array 131 of the CCD 113 and becomes a reflected light ray (flare ray) 15 (travelling in the B direction). Most of the reflected light ray 15 is refocused near a surface 121 of the original glass table 112 by the imaging lens 111. The light ray 15 reflected by the surface 121 of the original glass table 112 travels as the light ray (propagating in the C direction) tracing nearly the same optical path as the light ray 14, and reaches the surface of the CCD 113.

As described above, a flare due to multiple reflection between the original glass table 112 and the CCD 113 tends to be produced on or near the axis, but is hardly produced at an off-axis position due to the following reason. That is, as an off-axis light beam has a larger incident angle on the CCD 113 due to increased field angle, the light ray 15 reflected by the surface of the CCD 113 can hardly enter the imaging lens 111 again.

For example, when an image having a uniform intermediate density is read, streaks of a white flare appear near the central portion of the resultant image. This interferes with high image quality.

SUMMARY OF THE INVENTION

It is an object of the present invention to provide a low-cost, compact image reading apparatus in which a reading means is not perpendicular to the optical axis of an imaging optical system, or the optical axis between an original glass table and a first scanning mirror is not perpendicular to the original glass table to eliminate the multiple reflection flare between the original surface and reading means surface and improve the image quality of the image reading apparatus.

According to the present invention, an image reading apparatus for causing illumination means to illuminate an original placed on an original glass table, causing an imaging optical system to focus a light beam based on image information of the original surface on a surface of the reading means, and causing the reading means to read the image information is characterized in that the reading means is not perpendicular to an optical axis of the imaging optical system, and the following condition is satisfied:

$$\theta_i \geq \sin^{-1}(NA_i)$$

where $\theta_i$ is the tilt angle of the reading means with respect to the optical axis of the imaging optical system, and $NA_i$ is the numerical aperture of the imaging optical system on a reading means side. In particular, the following condition is satisfied:

$$\theta_0 \geq \sin^{-1}(NA_0)$$

where $\theta_0$ is the tilt angle of the original glass table with respect to the optical axis of the imaging optical system when the original glass table is not perpendicular to the optical axis of the imaging optical system, and $NA_0$ is the numerical aperture of the imaging optical system on an original side.

The image reading apparatus is characterized in that a light-shielding member is inserted between the imaging optical system and the reading means, and a normal to the reading means is directed toward the light-shielding member. Alternatively, the image reading apparatus is characterized in that a plurality of scanning mirrors are inserted between the original glass table and the imaging optical system.

According to the present invention, an image reading apparatus for causing illumination means to illuminate an original placed on an original glass table, causing an imaging optical system to focus a light beam based on image information of an illuminated original surface on a surface of the reading means through a plurality of scanning mirrors, and causing the reading means to read the image information is characterized in that an optical axis between the original glass table and a first scanning mirror of the plurality of scanning mirrors which opposes the original glass table is not perpendicular to the original glass table, and the following condition is satisfied:

$$\theta_0 \geq \sin^{-1}(NA_O)$$

where $\theta_0$ is the angle a normal to the original glass table makes with the optical axis between the original glass table and the first scanning mirror, and $NA_O$ is the numerical aperture of the imaging optical system on an original side.

According to the present invention, an image reading apparatus for moving an integral scanning optical system unit in a scanning direction to read image information of an original, the integral scanning optical system unit integrally housing illumination means for illuminating the original placed on an original glass table, a plurality of scanning mirrors for reflecting a light beam from the original illuminated with the illumination means, an imaging optical system for focusing a light beam reflected by the plurality of scanning mirrors, and reading means arranged at an imaging position of the imaging optical system, is characterized in that an optical axis between the original glass table and a first scanning mirror of the plurality of scanning mirrors which opposes the original glass table is not perpendicular to the original glass table, and the following condition is satisfied:

$$\theta_0 \geq \sin^{-1}(NA_O)$$

where $\theta_0$ is the angle a normal to the original glass table makes with the optical axis between the original glass table and the first scanning mirror, and $NA_O$ is the numerical aperture of the imaging optical system on an original side.

According to the present invention, an image reading apparatus for moving an integral scanning optical system unit in a scanning direction to read image information of an original, the integral scanning optical system unit integrally housing illumination means for illuminating the original placed on an original glass table, an imaging optical system for focusing a light beam from the original illuminated with the illumination means, and reading means arranged at an imaging position of the imaging optical system, is characterized in that the reading means is not perpendicular to an optical axis of the imaging optical system, and the following condition is satisfied:

$$\theta_i \geq \sin^{-1}(NA_i)$$

where $\theta_i$ is the tilt angle of the reading means with respect to the optical axis of the imaging optical system, and $NA_i$ is the numerical aperture of the imaging optical system on a reading means side. In particular, the following condition is satisfied:

$$\theta_0 \geq \sin^{-1}(NA_O)$$

where $\theta_0$ is the tilt angle of the original glass table with respect to the optical axis of the imaging optical system when the original glass table is not perpendicular to the optical axis of the imaging optical system, and $NA_O$ is the numerical aperture of the imaging optical system on an original side.

The image reading apparatus is characterized in that a light-shielding member is inserted between the imaging optical system and the reading means, and a normal to the reading means is directed toward the light-shielding member. Alternatively, the image reading apparatus is characterized in that a plurality of scanning mirrors are inserted between the original glass table and the imaging optical system.

According to the present invention, an image reading apparatus for moving an integral scanning optical system unit in a scanning direction to read image information of an original, the integral scanning optical system unit integrally housing illumination means for illuminating the original placed on an original glass table, a plurality of scanning mirrors for reflecting a light beam from the original illuminated with the illumination means, an imaging optical system for focusing a light beam reflected by the plurality of scanning mirrors, and reading means arranged at an imaging position of the imaging optical system, is characterized in that an optical axis between the original glass table and a first scanning mirror of the plurality of scanning mirrors which opposes the original glass table is not perpendicular to the original glass table, and the following condition is satisfied:

$$\theta_0 \geq \sin^{-1}(NA_O)$$

where $\theta_0$ is the angle a normal to the original glass table makes with the optical axis between the original glass table and the first scanning mirror, and $NA_O$ is the numerical aperture of the imaging optical system on an original side.

According to the present invention, an image reading apparatus for moving an integral scanning optical system unit in a scanning direction to read image information of an original, the integral scanning optical system unit integrally housing illumination means for illuminating the original placed on an original glass table, an imaging optical system for focusing a light beam from the original illuminated with the illumination means, and reading means arranged at an imaging position of the imaging optical system, is characterized in that the reading means is not perpendicular to an optical axis of the imaging optical system, and the following condition is satisfied:

$$\theta_i \geq \sin^{-1}(NA_i)$$

where $\theta_i$ is the tilt angle of the reading means with respect to the optical axis of the imaging optical system, and $NA_i$ is the numerical aperture of the imaging optical system on a reading means side. In particular, the following condition is satisfied:

$$\theta_0 \geq \sin^{-1}(NA_O)$$

where $\theta_0$ is the tilt angle of the original glass table with respect to the optical axis of the imaging optical system when the original glass table is not perpendicular to the optical axis of the imaging optical system, and $NA_O$ is the numerical aperture of the imaging optical system on an original side.

The image reading apparatus is characterized in that a light-shielding member is inserted between the imaging optical system and the reading means, and a normal to the reading means is directed toward the light-shielding member. Alternatively, the image reading apparatus is characterized in that a plurality of scanning mirrors are inserted between the original glass table and the imaging optical system.

DETAILED DESCRIPTION OF THE PREFERRED EMBODIMENTS

Figure 3:
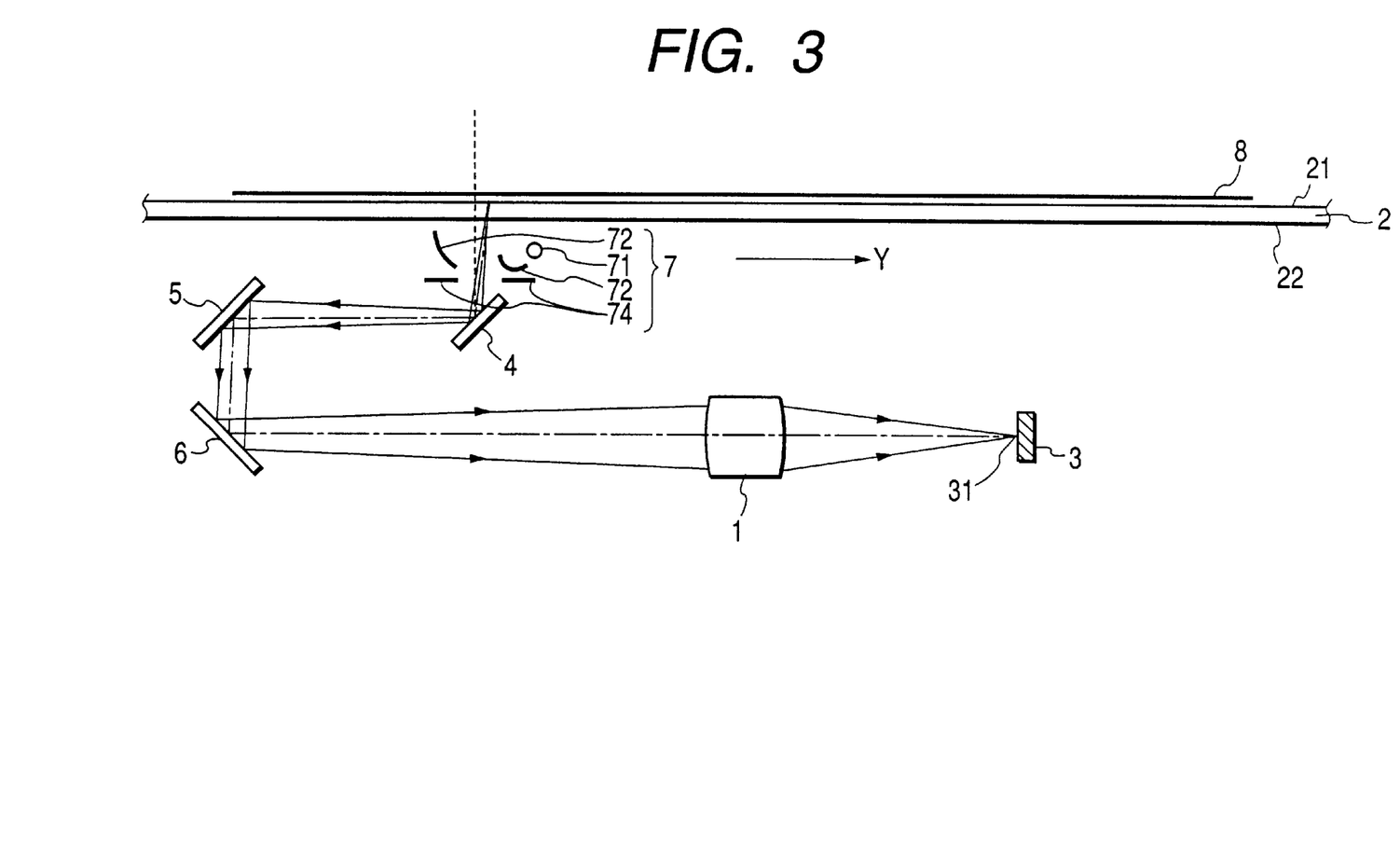
FIG. 3 is a schematic view showing the main part of the first embodiment of the present invention.

FIG. 3 is a schematic view showing the main part of the first embodiment in which an image reading apparatus of the present invention is used in, e.g., a digital copying machine or flat bed scanner.

Referring to FIG. 3, an original 8 is placed on an original glass table 2. An illumination means 7 is comprised of a light source 71 made of, e.g., a halogen or fluorescent lamp, reflector 72, and the like. A stop (slit) 74 has a long opening in a direction (main scanning direction) perpendicular to the sheet of drawing, which matches the pixel array direction of a CCD (line sensor) 3 serving as a reading means to be described later. Of the light beams travelling toward the CCD 3, the stop 74 limits the light beam which travels away from a pixel array 31. First, second, and third scanning mirrors 4, 5, and 6 guide a light beam having passed through the stop 74 toward an imaging lens 1 (to be described later). The imaging lens 1 serves as an imaging optical system and focuses a light beam based on image information of the original 8 surface on the CCD 3 surface. The reading means 3 is comprised of a CCD (line sensor) having a plurality of pixels arrayed in the main scanning direction.

In this embodiment, the original 8 placed on the original glass table 2 is illuminated from the two sides with a direct light beam from the light source 71 and a light beam incident through the reflector 72. The light beam reflected by the original 8 passes through the stop 74 and is focused on the surface of the CCD 3 by the imaging lens 1 through the first, second, and third scanning mirrors 4, 5, and 6. The optical image formed on the surface of the CCD 3 is converted into an electrical signal in accordance with the density of the original 8, and one-line image information in the main scanning direction is read. Image information in the sub-scanning direction (direction indicated by an arrow Y in FIG. 3) is read as follows. The first mirror table comprised of the light source 71, reflector 72, stop 74, and first scanning mirror (full-speed scanning mirror) 4 is moved in the sub-scanning direction with respect to the original 8. The second mirror table comprised of the second and third scanning mirrors (half-speed mirrors) 5 and 6 is moved in the sub-scanning direction at a speed half (moving speed ratio of 2:1) that of the first mirror table. The image information of the original 8 is read while the optical path length from the original 8 to the CCD 3 is kept constant.

The light source, reflector, slit, first to third scanning mirrors, and CCD in the image reading apparatus of this type elongate in a direction (main scanning direction) perpendicular to the sheet of drawing to read the entire line of the original in the main scanning direction and the entire area of the original by scanning the first and second mirror tables. This optical system is a so-called slit exposure optical system.

The CCD pixel array is composed of one line for a monochrome image read and three adjacent lines (monolithic 3-line sensor) of R, G, and B for a color image read. The magnification of the imaging lens is determined by the original read pitch and CCD pixel pitch. For example, when the read pitch is 600 DPI and the CCD pixel pitch is 7 $\mu$m, the imaging magnification $\beta$ is ×0.16535.

In this embodiment, the optical axis (optical path) between the original glass table 2 and the first scanning mirror 4 opposing the original glass table 2 is not perpendicular to the original glass table 2. The state of multiple-reflected light (flare) in this arrangement will be described with reference to FIG. 4.

Figure 4:
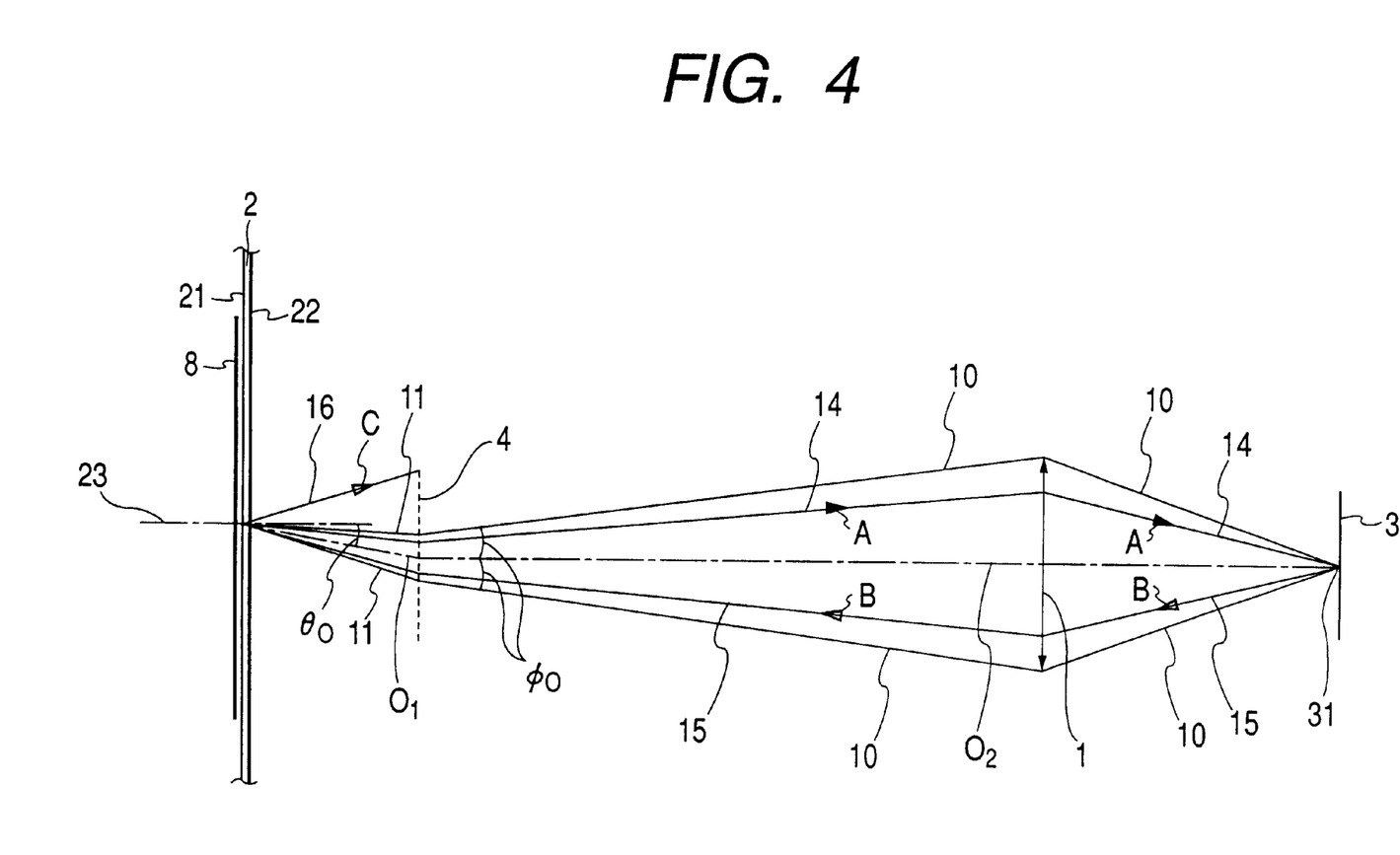
FIG. 4 is a schematic view showing the main part of the paraxial layout of a lens in FIG. 3.

FIG. 4 is a schematic view showing the main part of the optical system of the image reading apparatus from the viewpoint of paraxial optics. The same reference numerals as in FIG. 3 denote the same parts in FIG. 4. FIG. 4 shows only the elements of the main part of FIG. 3.

Referring to FIG. 4, light rays 10, 11, 14, 15, and 16 are illustrated. The light rays 10 and 11 are marginal light rays. An optical axis (optical path) $O_1$ connects the original glass table 2 and the first scanning mirror 4 and is not perpendicular to the original glass table 2. The imaging lens 1 has an optical axis $O_2$.

Referring to FIG. 4, the original 8 placed on a surface 21 of the original glass table 2 is illuminated with the illumination means (not shown). Of all the scattered and reflected light beams, a light beam inside the marginal light ray 11 is focused on the CCD 3 surface by the imaging lens 1. The light ray 14 (travelling in the A direction) is taken as one ray of the focused light beam. Part of the energy reaching the CCD 3 surface is reflected by the electrode surfaces of the CCD 3 and becomes a reflected light ray (flare ray), which then enters the imaging lens 1 again as the reflected light ray 15 (travelling in the B direction). Most of the reflected light ray 15 is focused again near the surface 21 of the original glass table 2 by the imaging lens 1. In this embodiment, however, since the optical axis $O_1$ is not perpendicular to the original glass table 2, the light ray (flare ray) 16 reflected by the surface 21 of the original glass table 2 travels in the direction indicated by an arrow C in FIG. 4. The light ray 16 does not travel toward the imaging lens 1. The multiple-reflected light ray does not reach the CCD 3 surface again, thereby preventing any flare (streaks).

In this embodiment, an angle $\theta_0$ a normal 23 to the original glass table 2 makes with the optical axis $O_1$ between the original glass table 2 and the first scanning mirror 4 satisfies the following condition, as can be apparent from FIG. 4:

$$\theta_0 \geq \phi_0$$

for $NA_0 = \sin \phi_0$ where $\phi_0$ is the angle between the marginal light ray 10 and the optical axis $O_2$ of the imaging lens 1, and $NA_0$ is the numerical aperture of the imaging lens 1 on the original 8 side, therefore $$\theta_0 \geq \sin^{-1}(NA_0)$$

That is, the elements are set to satisfy the following condition in this embodiment:

$$\theta_0 \geq \sin^{-1}(NA_0) \quad (1)$$

As described above, according to this embodiment, the optical axis $O_1$ between the original glass table 2 and the first scanning mirror 4 is not perpendicular to the original glass table 2. This can eliminate the flare caused by multiple reflection between the original 8 surface and the CCD 3 surface and can improve the image quality of the image reading apparatus. In addition, an increase in cost and a bulky apparatus can be prevented without greatly changing the arrangement of the apparatus.

Figure 5:
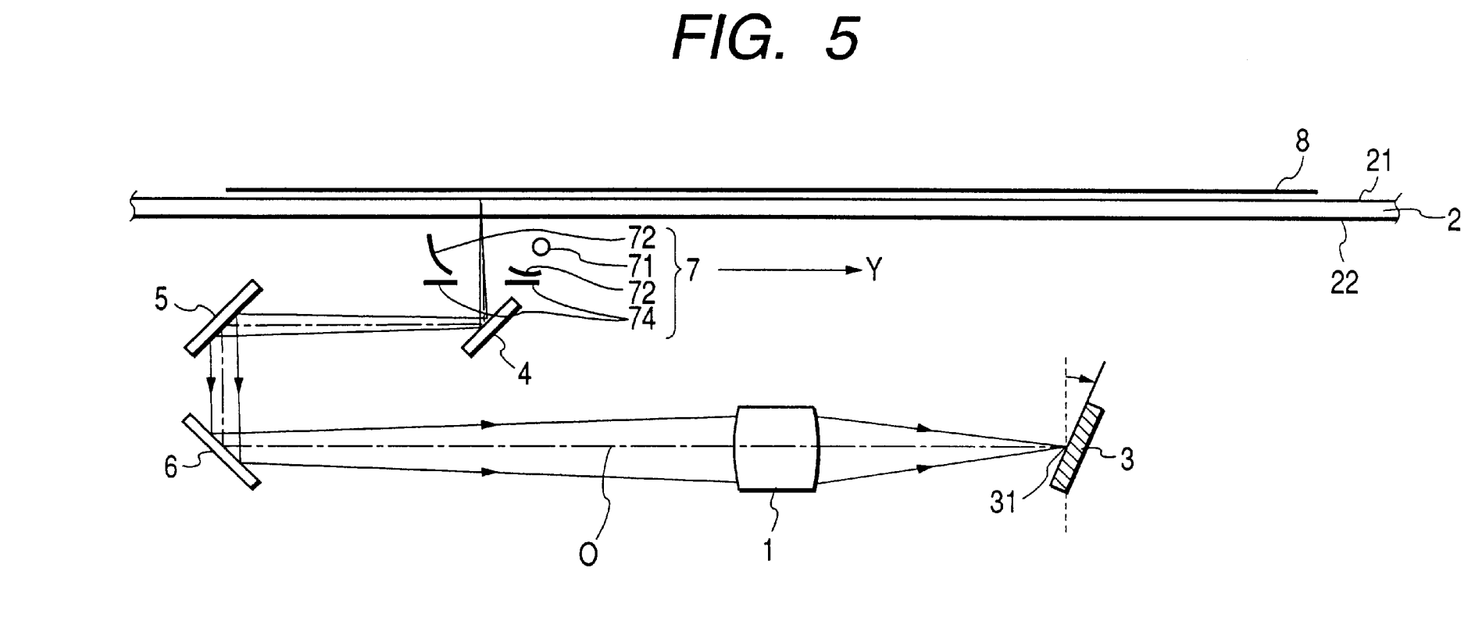
FIG. 5 is a schematic view showing the main part of the second embodiment of the present invention.

FIG. 5 is a schematic view g the main part of an image reading apparatus according to the second embodiment of the present invention. The same reference numerals as in FIG. 3 denote the same parts.

In the first embodiment, the optical axis $O_1$ between the original glass table 2 and the first scanning mirror 4 is not perpendicular to the original glass table 2. However, in the second embodiment, a CCD 3 serving as the reading means is not perpendicular to an optical axis O of an imaging lens 1. Any other arrangement of the second embodiment is substantially the same as that of the first embodiment, and the same effect as in the first embodiment can be obtained.

More specifically, referring to FIG. 5, the CCD 3 serves as the reading means and is not perpendicular to the optical axis O of the imaging lens 1. The state of multiple-reflected light (flare) will be described with reference to FIG. 6.

Figure 6:
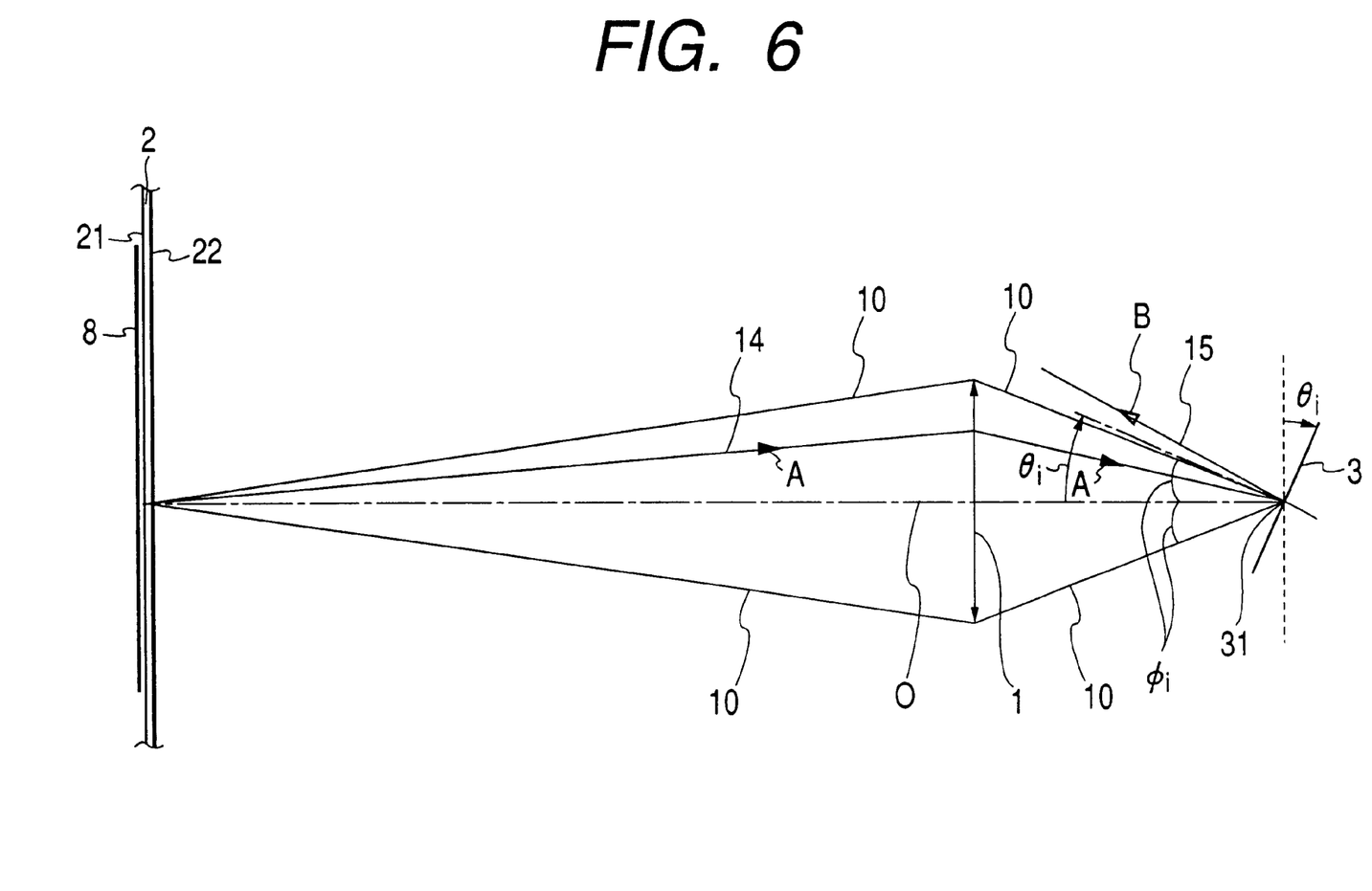
FIG. 6 is a schematic view showing the main part of the paraxial layout of a lens in FIG. 6.

FIG. 6 is a schematic view showing the main part of the optical system of the image reading apparatus shown in FIG. 5. The same reference numerals as in FIG. 3 denote the same parts. FIG. 6 shows only the elements of the main part in FIG. 5.

Light rays 10, 14, and 15 are illustrated in FIG. 6. The light ray 10 is a marginal light ray. The imaging lens 1 has the optical axis O.

Referring to FIG. 6, an original 8 placed on a surface 21 of an original glass table 2 is illuminated with the illumination means (not shown). Of all the scattered and reflected light beams, a light beam inside the marginal light ray 10 is focused on the CCD 3 surface by the imaging lens 1. The light ray 14 (travelling in the A direction) is taken as one ray of the focused light beam. Part of the energy reaching the CCD 3 surface is reflected by the electrode surfaces or the like of the CCD 3 and becomes a reflected light ray (flare ray), which then enters the imaging lens 1 again as the reflected light ray 15 (travelling in the B direction). According to this embodiment, however, since the CCD 3 is not perpendicular to the optical axis O of the imaging lens 1, the reflected light ray 15 travels in the B direction and does not travel toward the imaging lens. The multiple-reflected light ray does not reach the CCD 3 surface again, thereby preventing any flare (steaks).

A tilt angle $\theta_i$ of the CCD 3 with respect to the optical axis O of the imaging lens 1 satisfies the following condition:

$$\theta_i \geq \phi_i$$

for $NA_i = \sin \phi_i$ where $\phi_i$ is the angle between the marginal light ray 10 and the optical axis O of the imaging lens 1, and $NA_i$ is the numerical aperture of the imaging lens 1 on the CCD 3 side, therefore $$\theta_i \geq \sin^{-1}(NA_i)$$

That is, the elements are set to satisfy the following condition in this embodiment:

$$\theta_i \geq \sin^{-1}(NA_i) \quad (2)$$

As described above, according to this embodiment, the CCD 3 is not perpendicular to the optical axis O of the imaging lens 1. This can eliminate the flare caused by multiple reflection between the original 8 surface and the CCD 3 surface and can improve the image quality of the image reading apparatus. In addition, an increase in cost and a bulky apparatus can be prevented without greatly changing the arrangement of the apparatus.

Note that although the CCD 3 is tilted with respect to the optical axis O of the imaging lens 1, the original glass table 2 may be arranged so as not to cross the optical axis O of the imaging lens 1 perpendicularly.

The elements may be set to satisfy the following condition:

$$\theta_0 \geq \sin^{-1}(NA_0)$$

where $\theta_0$ is the tilt angle of the original glass table 2 with respect to the optical axis O of the imaging lens when the original glass table 2 is not perpendicular to the optical axis O of the imaging lens 1, and $NA_0$ is the numerical aperture of the imaging lens 1 on the original side.

Alternatively, both the original glass table 2 and the CCD 3 may be arranged so as not to cross the optical axis of the imaging lens 1 perpendicularly.

When an original surface is tilted with respect to the optical axis in general two-dimensional imaging, the imaging plane also tilts (e.g., the tilt lens of a camera lens), and the image is trapezoidally distorted. In this embodiment, since the slit exposure optical system is used as described above, no trapezoidal distortion occurs. That is, an image can be read at a predetermined magnification in the direction of a pixel array 31 of the CCD 3.

Figure 7:
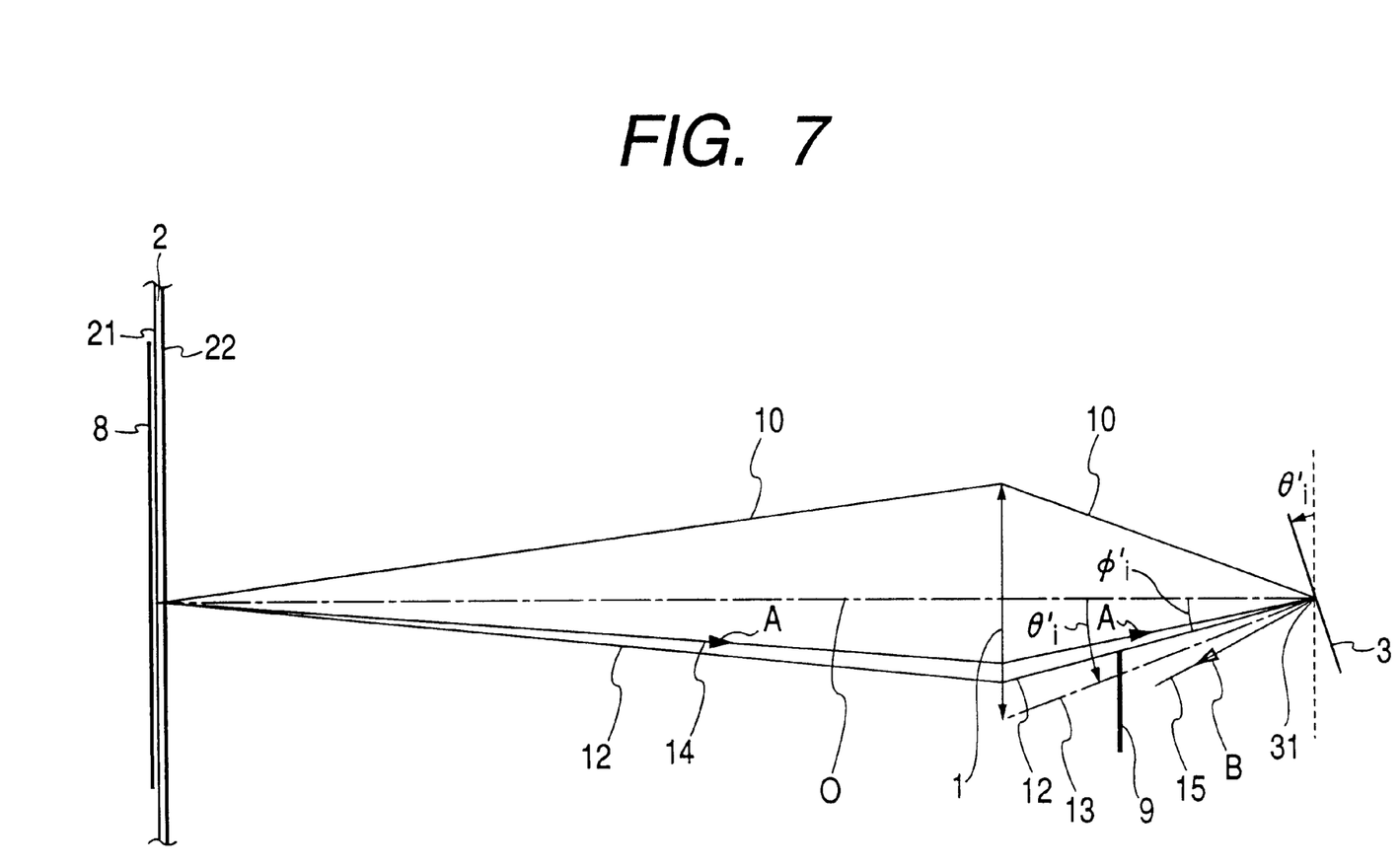
FIG. 7 is a schematic view showing the main part of the paraxial layout of the third embodiment of the present invention.

FIG. 7 is a schematic view showing the main part of an image reading apparatus according to the third embodiment of the present invention. The same reference numerals as in FIG. 6 denote the same parts in FIG. 7.

The third embodiment is different from the second embodiment in that an external stop serving as a light-shielding member is disposed in the optical path between an image lens and CCD, so that the normal to the CCD is directed toward the external stop. Any other arrangement and optical function of the third embodiment are the same as those of the second embodiment, and the same effect as in the second embodiment can be obtained in the third embodiment.

More specifically, as shown in FIG. 7, an external stop 9 serves as a light-shielding member. A practical example of the external stop 9 is a light amount correction plate which is known as a state-of-the-art technique and which corrects a decrease in the marginal light amount with respect to the on-axis light amount according to the cosine fourth law of the imaging lens 1. An effective marginal light ray 12 is determined by the external stop 9. In this embodiment, $NA_i' = \sin \phi_i'$ is determined in accordance with an angle $\phi_i'$ the marginal light ray 12 and the optical axis O of the imaging lens 1 make with each other. A tilt angle $\theta_i'$ of the CCD 3 with respect to the optical axis is set to satisfy the following condition:

$$\theta_i' \geq \sin^{-1}(NA_i')$$

where $NA_i'$ is the numerical aperture of the imaging lens 1 on the CCD 3 side.

In this embodiment, the tilt direction of the CCD 3 with respect to the optical axis is determined so that normal 13 to the CCD 3 is directed toward the external aperture 9. When the external aperture 9 is disposed as described above, the tilt angle of the CCD 3 can be reduced by the second embodiment described above not by considering the brightness of the imaging lens 1 but the NA of the entire optical system.

In this embodiment, an original 8 placed on a surface 21 of an original glass table 2 is illuminated with the illumination means (not shown). Of all the scattered and reflected light beams, a light beam inside marginal light rays 10 and 12 is focused on the CCD 3 surface by the imaging lens 1. A light ray 14 (travelling in the A direction) is taken as one ray of the focused light beam. Part of the energy reaching the CCD 3 surface is reflected by the electrode surfaces or the like of the CCD 3 and becomes a reflected light ray (flare ray), which then enters the imaging lens 1 again as a reflected light ray 15 (travelling in the B direction). According to this embodiment, however, since the CCD 3 is not perpendicular to the optical axis O of the imaging lens 1, the reflected light ray 15 propagates in the B direction, is shielded by the external stop 9, and does not travel toward the imaging lens 1. The multiple-reflected light ray does not reach the CCD 3 surface again, thereby preventing any flare (steaks).

As described above, according to this embodiment, the CCD 3 is not perpendicular to the optical axis of the imaging lens 1. At the same time, the external stop 9 is disposed in the optical path between the imaging lens 1 and the CCD 3 to direct the normal 13 to the CCD 3 toward the external stop 9. This can eliminate the flare caused by multiple reflection between the original 8 surface and the CCD 3 surface and can improve the image quality of the image reading apparatus. In addition, an increase in cost and a bulky apparatus can be prevented without greatly changing the arrangement of the apparatus.

In each embodiment described above, the present invention is applied to a scanning mirror type image reading apparatus in which the positions of the imaging lens 1 and CCD 3 are fixed with respect to the original glass table 2 and the first, second, and third scanning mirrors 4, 5, and 6 are moved. In the same manner as in each embodiment described above, the present invention is also applicable to any other type of image reading apparatus such as an integral scanning type image reading apparatus in which the first, second, and third scanning mirrors 4, 5, and 6 imaging lens 1, and CCD 3 are integrally scanned by a moving means, or an original moving type image reading apparatus in which the first, second, and third scanning mirrors 4, 5, and 6 imaging lens 1, and CCD 3 are fixed and the original 8 is moved by a moving means in the scanning direction, if the CCD 3 is not perpendicular to the optical axis O of the imaging lens 1 as described above or the optical axis $O_1$ between the original glass table 2 and the first scanning mirror 4 is not perpendicular to the original glass table 2.

As has been described above, according to the present invention, the reading means is not perpendicular to the optical axis of the imaging optical system. Alternatively, the optical axis between the original glass table and the first scanning mirror is not perpendicular to the original glass table. This can eliminate the flare caused by multiple reflection between the original surface and the reading means surface and can improve the image quality of the image reading apparatus. In addition, an increase in cost and a bulky apparatus can be prevented without greatly changing the arrangement of the apparatus.

What is claimed is:

1. An image reading apparatus comprising:
   an illumination unit adapted to illuminate an original placed on an original glass table;
   a reading unit; and
   an imaging optical system for focusing a light beam based on image information of an original surface illuminated with said illumination unit on a surface of said reading unit,
   wherein said reading unit is not perpendicular to an optical axis of said imaging optical system, and the following condition is satisfied:

$$\theta_i \geq \sin^{-1}(NA_i)$$

where $\theta_i$ is the tilt angle of said reading unit with respect to the optical axis of said imaging optical system, and $NA_i$ is the numerical aperture of said imaging optical system on a reading unit side, said image reading apparatus substantially preventing streaks of white flare from being generated by multiple reflection between said original surface and said surface of said reading unit.

2. An apparatus according to claim 1, wherein the following condition is satisfied:

$$\theta_0 \geq \sin^{-1}(NA_0)$$

where $\theta_0$ is the tilt angle of the original glass table with respect to the optical axis of said imaging optical system when the original glass table is not perpendicular to the optical axis of said imaging optical system, and $NA_0$ is the numerical aperture of said imaging optical system on an original side.

3. An apparatus according to claim 1, wherein a light-shielding member is inserted between said imaging optical system and said reading unit, a normal to said reading unit is directed toward said light-shielding member, and the reading unit is tilted at an angle that satisfies $\theta_i \geq \sin^{-1}(NA_i)$.

4. An apparatus according to claim 1, wherein a plurality of scanning mirrors are inserted between the original glass table and said imaging optical system.

5. An image reading apparatus comprising:
   an illumination unit adapted to illuminate an original placed on an original glass table;
   a reading unit;
   an imaging optical system for focusing a light beam based on image information of an original surface illuminated with said illumination unit on a surface of said reading unit; and
   a plurality of scanning mirrors disposed between the original glass table and said imaging optical system,
   wherein an optical axis between the original glass table and a first scanning mirror of said plurality of scanning mirrors which opposes the original glass table is not perpendicular to the original glass table, and the following condition is satisfied:

$$\theta_0 \geq \sin^{-1}(NA_0)$$

where $\theta_0$ is the angle a normal to the original glass table makes with the optical axis between the original glass table and said first scanning mirror, and $NA_0$ is the numerical aperture of said imaging optical system on an original side, said image reading apparatus substantially preventing streaks of white flare from being generated by multiple reflection between said original surface and said surface of said reading unit.

6. An image reading apparatus comprising:

an illumination unit adapted to illuminate an original placed on an original glass table;

a plurality of mirrors for reflecting a light beam based on image information of an original surface illuminated with said illumination unit;

an imaging optical system for focusing a light beam reflected by said plurality of mirrors;

a reading unit disposed at an imaging position of said imaging optical system; and an integral scanning unit integrally housing said illumination unit, said plurality of mirrors, said imaging optical system, and said reading unit, wherein an optical axis between the original glass table and a first mirror of said plurality of mirrors which opposes the original glass table is not perpendicular to the original glass table, and the following condition is satisfied:

$$\theta_0 \geq \sin^{-1}(NA_0)$$

where $\theta_0$ is the angle a normal to the original glass table makes with the optical axis between the original glass table and said first mirror, and $NA_0$ is the numerical aperture of said imaging optical system on an original side, said image reading apparatus substantially preventing streaks of white flare from being generated by multiple reflection between said original surface and said surface of said reading unit.

7. An image reading apparatus comprising:

an illumination unit adapted to illuminate an original placed on an original glass table;

an imaging optical system for focusing a light beam based on image information of an original surface illuminated with said illumination unit;

a reading unit disposed at an imaging position of said imaging optical system; and an integral scanning unit integrally housing said illumination unit, said imaging optical system, and said reading unit, wherein said reading unit is not perpendicular to an optical axis of said imaging optical system, and the following condition is satisfied:

$$\theta_i \geq \sin^{-1}(NA_i)$$

where $\theta_i$ is the tilt angle of said reading unit with respect to the optical axis of said imaging optical system, and $NA_i$ is the numerical aperture of said imaging optical system on a reading unit side, said image reading apparatus substantially preventing streaks of white flare from being generated by multiple reflection between said original surface and said surface of said reading unit.

8. An apparatus according to claim 7, wherein the following condition is satisfied:

$$\theta_0 \geq \sin^{-1}(NA_0)$$

where $\theta_0$ is the tilt angle of the original glass table with respect to the optical axis of said imaging optical system when the original glass table is not perpendicular to the optical axis of said imaging optical system, and $NA_0$ is the numerical aperture of said imaging optical system on an original side.

9. An apparatus according to claim 7, wherein a light-shielding member is inserted between said imaging optical system and said reading unit, a normal to said reading unit is directed toward said light-shielding member, and the reading unit is tilted at an angle that satisfies $\theta_i \geq \sin^{-1}(NA_i)$.

10. An apparatus according to claim 7, wherein a plurality of mirrors are inserted between the original glass table and said imaging optical system.

11. An image reading apparatus comprising:

an illumination unit adapted to illuminate an original placed on an original glass table;

a plurality of mirrors for reflecting a light beam based on image information of an original surface illuminated with said illumination unit;

an imaging optical system for focusing a light beam reflected by said plurality of mirrors;

a reading unit disposed at an imaging position of said imaging optical system; and a moving unit adapted to move the original glass table in a scanning direction, wherein an optical axis between the original glass table and a first mirror of said plurality of mirrors which opposes the original glass table is not perpendicular to the original glass table, and the following condition is satisfied:

$$\theta_0 \geq \sin^{-1}(NA_0)$$

where $\theta_0$ is the angle a normal to the original glass table makes with the optical axis between the original glass table and said first mirror, and $NA_0$ is the numerical aperture of said imaging optical system on an original side said image reading apparatus substantially preventing streaks of white flare from being generated by multiple reflection between said original surface and said surface of said reading unit.

12. An image reading apparatus comprising:

an illumination unit for illuminating an original placed on an original glass table;

an imaging optical system for focusing a light beam based on image information of an original surface illuminated with said illumination unit;

a reading unit disposed at an imaging position of said imaging optical system; and a moving unit adapted to move the original glass table in a scanning direction, wherein said reading unit is not perpendicular to an optical axis of said imaging optical system, and the following condition is satisfied:

$$\theta_i \geq \sin^{-1}(NA_i)$$

where $\theta_i$ is the tilt angle of said reading unit with respect to the optical axis of said imaging optical system, and $NA_i$ is the numerical aperture of said imaging optical system on a reading unit side said image reading apparatus substantially preventing streaks of white flare from being generated by multiple reflection between said original surface and said surface of said reading unit.

13. An apparatus according to claim 12, wherein the following condition is satisfied:

$$\theta_0 \geq \sin^{-1}(NA_0)$$

where $\theta_0$ is the tilt angle of the original glass table with respect to the optical axis of said imaging optical system when the original glass table is not perpendicular to the optical axis of said imaging optical system, and $NA_O$ is the numerical aperture of said imaging optical system on an original side.

14. An apparatus according to claim 12, wherein a light-shielding member is inserted between said imaging optical system and said reading unit, a normal to said reading unit is directed toward said light-shielding member, and the reading unit is tilted at an angle that satisfies $\theta_i \geq \sin^{-1}(NA_i)$.

15. An apparatus according to claim 12, wherein a plurality of mirrors are inserted between the original glass table and said imaging optical system.

16. An image reading apparatus comprising:
   an illumination unit adapted to illuminate an original placed on an original table;
   a reading unit; and
   an imaging optical system for focusing a light beam based on image information of an original surface illuminated with said illumination unit on a surface of said reading unit, wherein the light beam does not reach the surface of said reading unit more than once, and
   wherein said reading unit is not perpendicular to an optical axis of said imaging optical system, and the following condition is satisfied:

$$\theta_i \geq \sin^{-1}(NA_i)$$

where $\theta_i$ is the tilt angle of said reading unit with respect to the optical axis of said imaging optical system, and $NA_i$ is the numerical aperture of said imaging optical system on a reading unit side.

17. An apparatus according to claim 16, wherein the following condition is satisfied:

$$\theta_0 \geq \sin^{-1}(NA_0)$$

where $\theta_0$ is the tilt angle of the original table with respect to the optical axis of said imaging optical system when the original table is not perpendicular to the optical axis of said imaging optical system, and $NA_0$ is the numerical aperture of said imaging optical system on an original side.

18. An apparatus according to claim 16, wherein a light-shielding member is inserted between said imaging optical system and said reading unit, a normal to said reading unit is directed toward said light-shielding member, and the reading unit is tilted at an angle that satisfies $\theta_i \geq \sin^{-1}(NA_i)$.

19. An apparatus according to claim 16, wherein a plurality of mirrors are inserted between the original table and said imaging optical system.

20. An image reading apparatus comprising:
   an illumination unit adapted to illuminate an original placed on an original table;
   a reading unit;
   an imaging optical system for focusing a light beam based on image information of an original surface illuminated with said illumination unit on a surface of said reading unit, wherein the light beam does not reach the surface of said reading unit more than once; and
   a plurality of mirrors disposed between the original table and said imaging optical system,
   wherein an optical axis between the original table and a first scanning mirror of said plurality of mirrors which opposes the original table is not perpendicular to the original table, and the following condition is satisfied:

$$\theta_0 \geq \sin^{-1}(NA_0)$$

where $\theta_0$ is the angle a normal to the original table makes with the optical axis between the original table and said first scanning mirror, and $NA_0$ is the numerical aperture of said imaging optical system on an original side.

21. An apparatus according to claim 20, wherein the following condition is satisfied:

$$\theta_0 \geq \sin^{-1}(NA_0)$$

where $\theta_0$ is the tilt angle of the original table with respect to the optical axis of said imaging optical system when the orignal table is not perpendicular to the optical axis of said imaging optical system, and $NA_0$, is the numerical aperture of said imaging optical system on an original side.

22. An apparatus according to claim 20, wherein a light-shielding member is inserted between said imaging optical system and said reading unit, and a normal to said reading unit is directed toward said light-shielding member, and the reading unit is tilted at an angle that satisfies $\theta_i \geq \sin^{-1}(NA_i)$,
   where $\theta_i$ is the tilt angle of said reading unit with respect to the optical axis of said imaging optical system, and $NA_i$ is the numerical aperture of said imaging optical system on a reading unit side.

* * * * *

UNITED STATES PATENT AND TRADEMARK OFFICE
CERTIFICATE OF CORRECTION

PATENT NO. : 6,469,774 B1
DATED : October 22, 2002
INVENTOR(S) : Kazumi Kimura

It is certified that error appears in the above-identified patent and that said Letters Patent is hereby corrected as shown below:

Column 1,
Line 24, "(in" should read -- in --.

Column 9,
Line 47, "6" should read -- 6, --.
Line 50, "6," should read -- 6, --.

Column 12,
Lines 32 and 55, "side said" should read -- side, said --.

Column 14,
Line 32, "orignal" should read -- original --.
Line 33, "$NA_0$," should read -- $NA_0$ --.

Signed and Sealed this

Twenty-fifth Day of March, 2003

JAMES E. ROGAN
*Director of the United States Patent and Trademark Office*